(12) United States Patent
Johnson et al.

(10) Patent No.: US 7,856,574 B2
(45) Date of Patent: Dec. 21, 2010

(54) INTERNET CONNECTIVITY EVALUATION

(75) Inventors: Erik S. Johnson, Bothell, WA (US); Karl Froelich, Snohomish, WA (US); Vivek M. Sawant, Redmond, WA (US); Francesco Faggioli, Woodinville, WA (US); Chong Zhang, Bellevue, WA (US); Ramakrishnan Peruvemba, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 11/904,394

(22) Filed: Sep. 27, 2007

(65) Prior Publication Data

US 2009/0089620 A1  Apr. 2, 2009

(51) Int. Cl.
 *G06F 11/00* (2006.01)
(52) U.S. Cl. .............................. 714/25; 714/38; 714/43; 714/46; 714/47; 714/57; 715/736
(58) Field of Classification Search .................. 714/25, 714/38, 43, 46, 47, 57; 715/736
 See application file for complete search history.

(56) References Cited

U.S. PATENT DOCUMENTS

| | | | |
|---|---|---|---|
| 5,680,585 A * | 10/1997 | Bruell | 703/26 |
| 6,076,113 A | 6/2000 | Ramanathan et al. | |
| 6,205,413 B1 * | 3/2001 | Bisdikian et al. | 703/24 |
| 6,321,348 B1 | 11/2001 | Kobata | |
| 6,473,798 B1 * | 10/2002 | Grosser et al. | 709/224 |
| 6,546,547 B1 * | 4/2003 | Runyan et al. | 717/124 |
| 6,578,077 B1 * | 6/2003 | Rakoshitz et al. | 709/224 |
| 6,598,183 B1 * | 7/2003 | Grieco et al. | 714/43 |
| 6,697,969 B1 * | 2/2004 | Merriam | 714/46 |
| 6,738,933 B2 * | 5/2004 | Fraenkel et al. | 714/47 |
| 6,754,701 B1 * | 6/2004 | Kessner | 709/219 |
| 6,772,375 B1 | 8/2004 | Banga | |
| 6,801,939 B1 | 10/2004 | Chafe | |
| 6,865,691 B1 * | 3/2005 | Brundridge et al. | 714/25 |
| 6,970,924 B1 * | 11/2005 | Chu et al. | 709/224 |
| 6,996,067 B1 * | 2/2006 | Burke et al. | 370/248 |
| 7,055,137 B2 * | 5/2006 | Mathews | 717/125 |
| 7,093,169 B2 * | 8/2006 | Merriam | 714/47 |
| 7,103,034 B1 | 9/2006 | Srinivas et al. | |
| 7,257,741 B1 * | 8/2007 | Palenik et al. | 714/43 |
| 7,350,115 B2 * | 3/2008 | Mathew et al. | 714/46 |
| 7,509,229 B1 * | 3/2009 | Wen | 702/179 |
| 2001/0053961 A1 * | 12/2001 | Liu et al. | 702/123 |
| 2002/0133575 A1 * | 9/2002 | Cidon et al. | 709/220 |

(Continued)

OTHER PUBLICATIONS

"Intel UPnP Internet Gateway Device (Evaluation Version)", http://www.intel.com/cd/ids/developer/asmo-na/eng/dc/linux/reference/52747.htm.

(Continued)

*Primary Examiner*—Robert Beausoliel
*Assistant Examiner*—Joshua P Lottich

(57) ABSTRACT

Internet connectivity evaluation provides for easy, efficient and effective testing of the Internet connectivity behavior between an operating system hosted on a computing device and an IGD (Internet Gateway Device) interacting with the computing device. With a user's computing device communicating with one or more servers, or server-type devices, interacting with, or otherwise communicating with, the Internet, Internet connectivity evaluation can quickly and cost-effectively be performed to identify known major issues in the interaction between the operating system hosted on the user's computing device and an IGD.

20 Claims, 11 Drawing Sheets

U.S. PATENT DOCUMENTS

| | | | |
|---|---|---|---|
| 2002/0144187 A1* | 10/2002 | Morgan et al. | 714/43 |
| 2002/0165698 A1* | 11/2002 | Pronk et al. | 702/183 |
| 2003/0033406 A1* | 2/2003 | John et al. | 709/224 |
| 2003/0128711 A1* | 7/2003 | Olariu et al. | 370/401 |
| 2003/0134631 A1* | 7/2003 | Snyder et al. | 455/423 |
| 2003/0187985 A1 | 10/2003 | Rohling et al. | |
| 2004/0044761 A1* | 3/2004 | Phillipi et al. | 709/223 |
| 2004/0153858 A1* | 8/2004 | Hwang | 714/43 |
| 2004/0255191 A1* | 12/2004 | Fox et al. | 714/25 |
| 2005/0144502 A1 | 6/2005 | Gandhi et al. | |
| 2005/0154553 A1* | 7/2005 | Wheeler et al. | 702/123 |
| 2005/0198272 A1* | 9/2005 | Bernard et al. | 709/224 |
| 2005/0265240 A1* | 12/2005 | Jain et al. | 370/241 |
| 2006/0034185 A1* | 2/2006 | Patzschke et al. | 370/252 |
| 2006/0095401 A1* | 5/2006 | Krikorian et al. | 707/1 |
| 2006/0100815 A1* | 5/2006 | Wheeler et al. | 702/121 |
| 2006/0140131 A1* | 6/2006 | Cahn | 370/241 |
| 2006/0159232 A1 | 7/2006 | Jiang et al. | |
| 2007/0081467 A1* | 4/2007 | Hurst et al. | 370/248 |
| 2007/0088871 A1* | 4/2007 | Kwong et al. | 710/39 |
| 2007/0177513 A1* | 8/2007 | Kuokkanen | 370/241 |
| 2007/0192445 A1* | 8/2007 | Lord et al. | 709/219 |
| 2007/0255784 A1* | 11/2007 | Takechi et al. | 709/203 |
| 2008/0034123 A1* | 2/2008 | Hirao et al. | 709/253 |
| 2008/0259943 A1* | 10/2008 | Miyajima et al. | 370/401 |
| 2008/0270837 A1* | 10/2008 | Kiefer et al. | 714/38 |
| 2009/0037976 A1* | 2/2009 | Teo et al. | 726/1 |
| 2009/0323516 A1* | 12/2009 | Bhagwan et al. | 370/216 |

OTHER PUBLICATIONS

Ford Bryan, "Scalable Internet Routing on Topology-Independent Node Identities", Date: Oct. 31, 2003, pp. 1-15.

Madsen, et al., "Connectivity Probability of Wireless Ad Hoc Networks: Definition, Evaluation, Comparison", Date: 2005, p. 1-22.

* cited by examiner

RESULT:

TRYING TO CONSTRUCT AN OPEN REQUEST TO THE WEBPAGE :IGDTOOLSERVER-TEST/CONNNECTIVITY/TEST.TXT
SUCCESSFULLY CONSTRUCTED AN OPEN REQUEST
TRYING TO SEND THE CONSTRUCTED OPEN REQUEST
SUCCESSFULLY SENT THE CONSTRUCT OPEN REQUEST
WAITING FOR THE RESPONSE FROM THE IGD TEST SERVER
SUCCESSFULLY RECEIVED THE RESPONSE FROM THE TEST SERVER
QUERYING THE DATA SIZE OF THE RECEIVED CONTENT
SUCCESSFULLY QUERIED THE DATA SIZE OF THE RECEIVED CONTENT
RECEIVED 37 BYTES OF CONTENT FROM THE IGD TEST SERVER
IPV4 CONNECTIVITY SUCCEEDS THROUGH THE IGD

RESULT:

TRYING TO RESOLVE THE TEREDO SERVER IP ADDRESS
PRIMARY TEREDO SERVER IP ADDRESS: 65.54.227.138
SECONDARY TEREDO SERVER IP ADDRESS 65.54.227.139
STARTING EXERCISING WITH PRIMARY TEREDO SERVER
SENDING A ROUTER SOLICITATION FRAME WITH CONEBIT ON
SENDING A ROUTER SOLICITATION FRAME WITH CONEBIT OFF
FAILED TO SEND ROUTER SOLICITATION FRAME WITH CONEBIT OFF
DIDN'T RECEIVE ANY ROUTER ADVERTISEMENT FRAME FROM THE TEREDO SERVER

INTERNET CONNECTIVITY EVALUATION

BACKGROUND

Computer users today, for the most part, whether in an office or at home, interact with the Internet, or world wide web. Along with a computer or computer-based device, e.g., BLACKBERRY® hand-held devices, computer-based cell phones, etc., collectively referred to herein as computing devices, hardware for facilitating the computing device interacting with the Internet is generally required. One currently common piece of hardware for such communication facilitation that is present in various computing networks, including computer users' home networks, is an Internet Gateway Device (IGD). IGDs are also referred to, or otherwise known as, routers, NATs (Network Access Translators), gateways, customer premise equipment, access points, etc.

IGDs add value to computing networks, including, but not limited to, supporting multiple computing devices accessing the Internet at no additional cost and providing wireless capability to the computing network. IGDs are relatively inexpensive and can even be free when supplied by a high-speed Internet Service Provider (ISP).

However, interoperability problems between the operating system running on a particular computing device and the IGD of a computing network can degrade and even block a computing device user's access to the Internet. Such problems can, in turn, potentially impair the user's ability to discover the problem and seek appropriate solutions. These problems are generally especially troublesome for home-based computing network users who often do not have the background and/or interest-level to understand where the issues may lie or what to do to correct them. Thus, it is desirable for computing device users to have an easy, effective and efficient mechanism for checking their computing device's operating system with the IGD of the computing network. It is further desirable when problems are detected in the interaction between a computing device operating system and an IGD that appropriate and understandable guidance be provided to the user in order that the user can make well-informed decisions as to how to proceed to effect a workable outcome.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include methodology for Internet connectivity evaluation between an operating system hosted on a user's computing device and an IGD (Internet Gateway Device) interacting with the user's computing device. In an embodiment, upon user agreement, an Internet connectivity evaluation (ICE) software component, or program, is downloaded from a web site hosted on the Internet to a user's computing device. In an embodiment the user can then click on, or otherwise select, a start test button exhibited on a screen output to the user's computing device display to run a suite of connectivity tests designed to identify currently known potential issues in the interaction between an operating system hosted on the user's computing device and an IGD. In an embodiment all connectivity test analysis is performed locally, on the user's computing device, providing a measure of security to both the user and the user's computing device.

Embodiments discussed herein include providing connectivity test results to the user that a user can understand and/or refer to when the user may desire to upgrade or replace the IGD interacting with the user's computing device. Embodiments discussed herein include providing both brief and detailed connectivity test results to the user for each connectivity test executed.

BRIEF DESCRIPTION OF THE DRAWINGS

These and other features will now be described with reference to the drawings of certain embodiments and examples which are intended to illustrate and not to limit the invention, and in which:

FIG. 8A depicts an exemplary embodiment detailed report for a successfully executed connectivity test.

FIG. 8B depicts an exemplary embodiment detailed report for a connectivity test that failed to successfully execute.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention. Any and all titles used throughout are for ease of explanation only and are not for use in limiting the invention.

Figure 1:
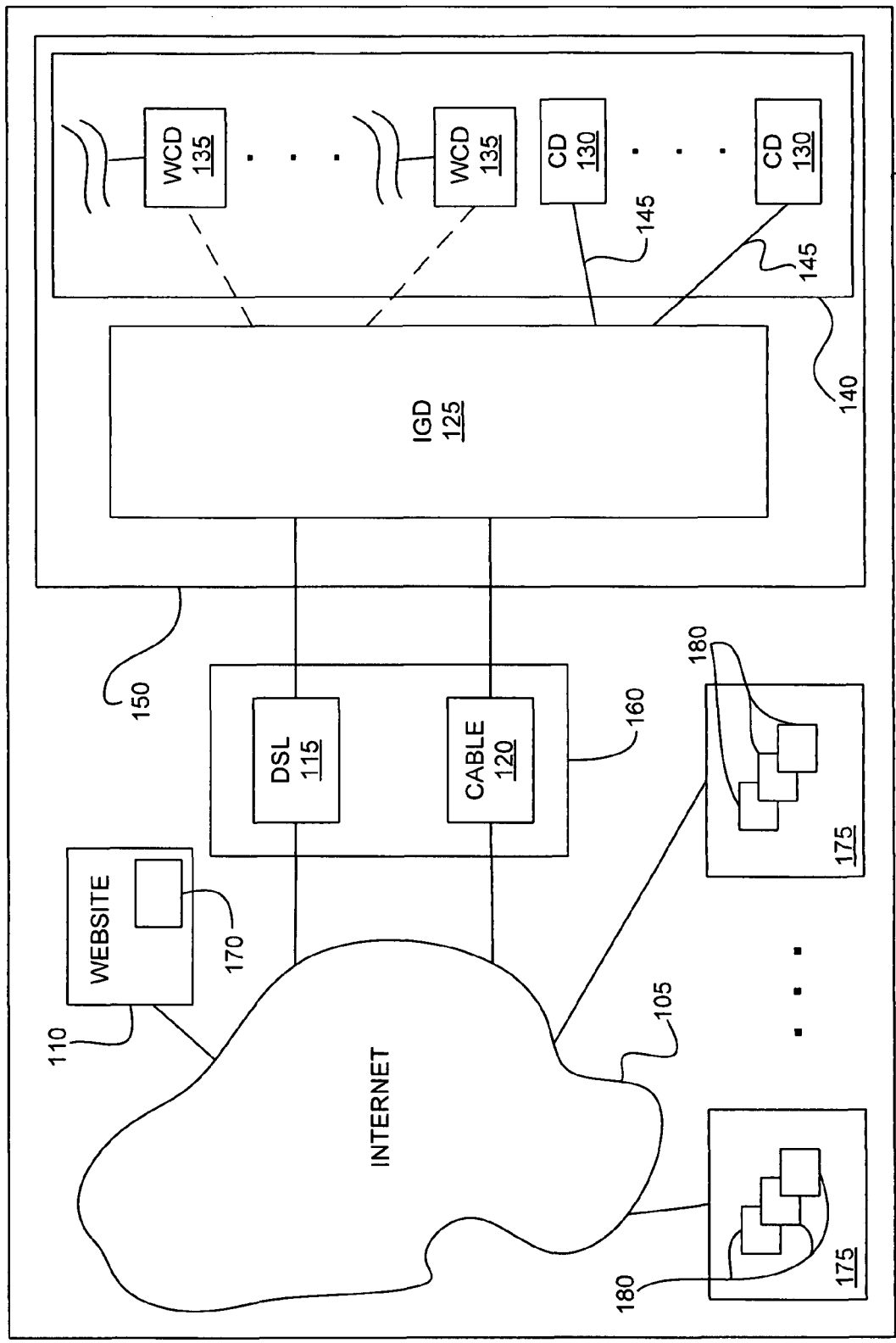
FIG. 1 is an embodiment computing device environment supporting Internet connectivity evaluation.

An embodiment computing device environment 100, depicted in FIG. 1, supports testing, or otherwise evaluating, Internet connectivity within the environment 100 and providing potential solutions when problems are detected. More specifically, an embodiment computing device environment 100 supports light-weight testing of the interoperability of a computing device 140 on a computing network 150 with the IGD (Internet Gateway Device) 125 of the network 150. In an embodiment the IGD 125 of the computing network 150 is any device that facilitates, or otherwise supports, a computing device 140 interacting with the Internet, or world wide web, 105, such as, but not limited to, a router, customer premise equipment, an access point, a NAT (Network Access Translator), etc.

In an embodiment computing device environment 100 one or more wired computing devices 130 are connected, via appropriate cables 145, to an IGD 125 of the computing network 150. In an embodiment computing device environment 100 one or more wireless, e.g., but not limited to, radio frequency wireless, optical wireless, etc., computing devices 135 are also, or alternatively, established to interact with the IGD 125. The wired computing device(s) 130 and wireless computing device(s) 135 of the embodiment computing device environment 100 are, collectively, computing devices 140.

In an embodiment the IGD 125 of the computing network 150 uses an established medium 160 for communicating with the Internet 105. In an aspect of this embodiment the IGD 125 uses a cable system 120 to interact with the Internet 105. In an alternative aspect of this embodiment the IGD 125 uses DSL 115 to communicate with the Internet 105. In other alternative aspects of this embodiment other communication mediums 160 are used by the IGD 125 for communicating with the Internet 105.

In an embodiment an Internet connectivity evaluation (ICE) website 110, hosted via the Internet 105, is established for use in testing the interoperability between the IGD 125 and any computing device 140 on the computing network 150.

In an embodiment a user of a computing device 140 accesses the website 110, which, upon user agreement, downloads an ICE (Internet connectivity evaluation) software component, or program, 170 to the computing device 140. In an embodiment the ICE software component 170 thereafter can automatically initiate to run on the computing device 140. In an embodiment the ICE software component 170 is ActiveX technology used for developing reusable object-orientated software components, or programs. In alternative embodiments the ICE software component 170 is based on other technologies.

In an embodiment, as the ICE website 110 downloads the ICE software component 170 to the user's computing device 140, and the ICE software component 170 is developed to automatically run after download, this simplifies the user experience as the user need not decide where to store the ICE software component 170 or determine how to initiate it to run.

In an embodiment the ICE software component 170 is subject to versioning control. In an embodiment automatic versioning is enabled in order that when a user accesses the ICE website 110 and a newer version of the ICE software component 170 exists than what is presently hosted on the user's computing device 140, the newer version of the ICE software component 170 is downloaded, upon user agreement, to the user's computing device 140.

In an embodiment one or more servers 175, or server-type devices, connected to the Internet 105 supply data 180, e.g., but not limited to, bit streams, one or more files, e.g., text files and/or data files, etc., and/or any combination thereof, requested by the ICE software component 170, as necessary, to support Internet connectivity testing, or evaluation, on the computing network 150.

In an embodiment the ICE software component 170 runs one or more tests to determine whether or not the IGD 125 and a computing device 140 of the computing network 150 operate effectively together. In an embodiment the ICE software component 170 runs, or attempts to run, six (6) tests designed to discover generally common, or likely, problems in the interaction between the IGD 125 and a computing device 140 of a computing network 150.

Figure 2:
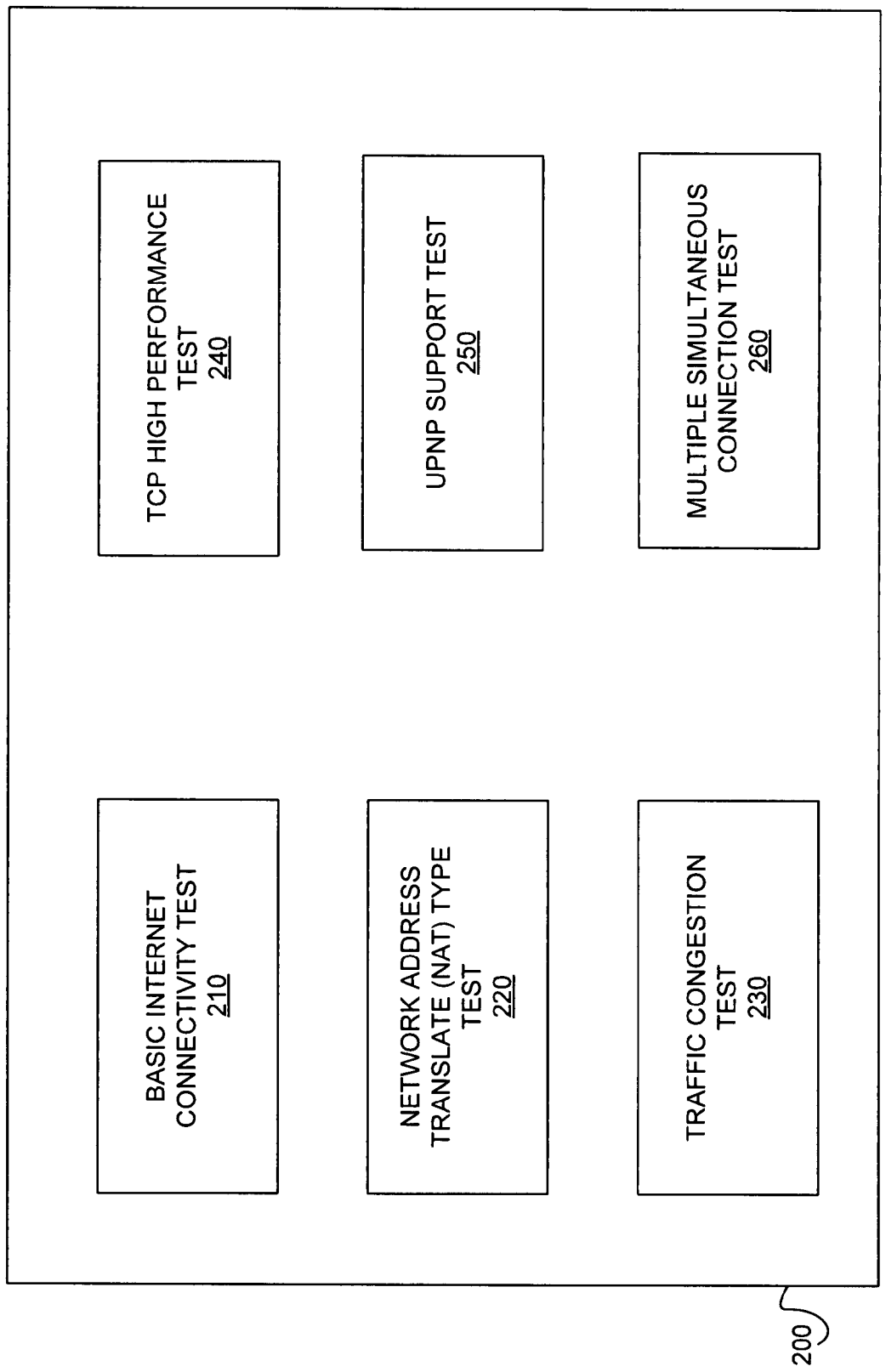
FIG. 2 identifies embodiment connectivity tests performed by an embodiment Internet connectivity evaluation software component.

Referring to FIG. 2 embodiment connectivity tests 200 are supported by the ICE software component 170. In an embodiment a connectivity test 200 is an IPv4, or basic Internet, connectivity test 210. In an embodiment a connectivity test 200 is a NAT (Network Address Translate) type test 220. In an embodiment a connectivity test 200 is an ECN (explicit congestion notification) support, or traffic congestion, test 230. In an embodiment a connectivity test 200 is a windows scaling support, or TCP (transmission control protocol) high performance, test 240. In an embodiment a connectivity test 200 is a UPnP (Universal Plug and Play) support test 250. In an embodiment a connectivity test 200 is a multiple simultaneous connection test 260.

In other embodiments additional, less and/or other tests are run by the ICE software component 170.

In an embodiment the IPv4, or basic Internet, connectivity test 210 checks whether the user's computing device 140 has basic Internet connectivity. In order for the user to have reached the web site 110 to access the connectivity tests 200, the user's computing device 140 had to have had basic Internet connectivity. If a user's computing device 140 fails this basic Internet connectivity test 210 it may be that the computing device 140 recently lost connectivity, possibly because the IGD 125 or the Internet connection 160 stopped working. Another potential reason for failure of the basic Internet connectivity test 210 is that the IGD 125 or the Internet connection 160 only provides intermittent connectivity. If the user's computing device 140 is a wireless computing device 135 wireless interference may cause the basic Internet connectivity test 210 to fail. Additionally, other software or network devices, such as, but not limited to, a firewall or proxy, may cause the basic Internet connectivity test 210 to fail by preventing the ICE software component 170 downloaded to the user's computing device 140 from properly communicating with the Internet 105.

In an embodiment the basic Internet connectivity test 210 can take up to sixty (60) seconds to execute.

In an embodiment a function of an IGD 125 is network address translation (NAT). In general, an IGD 125 providing NAT support assigns private IP addresses on the local network, e.g., computing network 150. NAT maps the private addresses on the local, or inside, network, to a public IP (Internet protocol) address so that computing devices 140 behind the IGD 125 can communicate with the Internet 105. There are different Network Address Translator types, e.g., cone, restricted, and symmetric, that each work in different ways. Some Internet protocols, e.g., IPv6 tunneling over IPv4, work better through IGDs 125 that support one NAT type, e.g., cone, rather than another NAT type, e.g., symmetric.

In an embodiment the NAT type test 220 identifies the NAT type associated with the IGD 125 working with a user's computing device 140 on the computing network 150. In an embodiment the NAT type test 220 is successful if the NAT type is determined to be full cone or restricted cone. In an embodiment the NAT type test 220 indicates failure if the NAT type is determined to be symmetric cone.

In an embodiment a NAT type test 220 failure means that the IGD 125 NAT type is symmetric, in which case some program traffic using IPv6 tunneling over IPv4 may potentially be blocked, causing the program to fail to run, or run in a degraded manner. In an embodiment, however, an IGD 125 with a symmetric NAT type does not impact basic Internet connectivity for the user's computing device 140.

In an embodiment the NAT type test 220 can take up to sixty (60) seconds to execute.

IGDs 125 can lose information, i.e., packets, being transferred across the Internet 105 when the IGD 125 experiences congestion, i.e., full IGD 125, or router, queues. Internet protocols, such as the Transport Control Protocol (TCP), use packet loss as a congestion indicator. ECN (Explicit Congestion Notification) is a mechanism for providing IGDs 125 with an alternative method of communicating network congestion that effectively reduces TCP retransmissions and increases packet throughput. Some IGDs 125, however, do not work properly with TCP packets that have the ECN mechanism, or option, enabled.

In an embodiment the ECN support, or traffic congestion, test 230 determines whether the IGD 125 on the computing network 150 works properly with TCP packets that have the ECN mechanism, or option, enabled. In an embodiment the ECN support test 230 attempts to download a short file from the Internet 105 to the user's computing device 140, first with the ECN mechanism, or option, enabled, and then again with the ECN mechanism, or option, disabled. In an embodiment, if both downloads are successful the ECN support test 230 is successful and indicates that the IGD 125 allows packets through with the ECN mechanism, or option, set.

In an embodiment, if the ECN support, or traffic congestion, test 230 fails, the user's computing device 140 operating system cannot use ECN to detect network congestion and optimize downloads from the Internet 105. However, a failed ECN support, or traffic congestion, test 230 does not generally indicate any failure in the computing device 140's basic Internet connectivity.

In an embodiment the ECN support, or traffic congestion, test 230 can take up to sixty (60) seconds to execute.

Window scaling is a Transport Control Protocol (TCP) option that can be used to address computing device 140 performance problems. Some known operating systems running on a user's computing device 140 periodically scale the amount of data transferred between a user's computing device 140 and, e.g., the Internet 105, before requiring acknowledgement handshaking. In general a larger amount of data, or data window, before acknowledgement handshaking is efficient if there is a good quality and/or fast connection between a user's computing device 140 and, e.g., the Internet 105. In contrast, in general a smaller amount of data, or data window, before acknowledgement handshaking is efficient if there is a poor quality and/or slow connection between a user's computing device 140 and, e.g., the Internet 105. Some IGDs 125, however, cause TCP data transfers involving window scaling to fail.

In an embodiment the windows scaling, or TCP high performance, test 240 checks whether the IGD 125 works with window scaling enabled on the user's computing device 140. In an embodiment the windows scaling test 240 downloads from the Internet 105 a series of files of increasing size until either an incomplete download is encountered or all downloads succeed. In an embodiment a series of six (6) file downloads of increasing size are executed by the windows scaling test 240. In an embodiment, if all file downloads are successful the windows scaling, or TCP high performance, test 240 is successful and indicates that the IGD 125 works with an operating system that performs automatic windows scaling to negotiate an efficient data transfer rate for improving download speeds.

In an embodiment, if the windows scaling, or TCP high performance, test 240 fails, the user's computing device 140 operating system cannot use windows scaling with the current IGD 125. However, a failed windows scaling, or TCP high performance, test 240 does not generally indicate any failure in the computing device 140's basic Internet connectivity.

In an embodiment the windows scaling, or TCP high performance, test 240 can take up to sixty (60) seconds to execute.

Known applications require opening ports through an IGD 125 to allow incoming traffic, e.g., when both communicating endpoints, e.g., two different user's computing devices 140, are behind different IGDs 125. Some known IGDs 125 allow computing devices 140 to create such open ports using Universal Plug and Play (UPnP). In an embodiment the UPnP support test 250 checks that the IGD 125 on the computing network 150 has UPnP enabled, can support a number of open ports, and can maintain the open port settings for a time.

In an embodiment the UPnP support test 250 opens one (1) to twenty (20) UDP (User Datagram Protocol) ports on the IGD 125 of the computing network 150, the number of ports opened determined by how many port mappings of any type are already open on the IGD 125 at the time the UPnP support test 250 runs. In an embodiment if there are twenty (20) or more UDP ports already open on the IGD 125 at the time the UPnP support test 250 runs, the test 250 does not open any additional UDP ports. In an embodiment random port numbers are opened on the IGD 125.

In an embodiment ports opened by the UPnP support test 250 are left open for a predetermined amount of time and then are closed before the test 250 finalizes. In an aspect of this embodiment ports are opened by the UPnP support test 250 and are left open for one (1) minute before they are then closed.

In an embodiment those ports that are specifically opened by the UPnP support test 250 are named in such a manner that a user can easily identify such ports, and safely close them, if they are not successfully closed by the UPnP support test 250. In an aspect of this embodiment the ports specifically opened by the UPnP support test 250 are named "removemex" where x is a number from zero (0) to nineteen (19).

In an embodiment, if all ports opened, or otherwise used, by the UPnP support test 250 remain open for the required time of the test 250, or if twenty (20) or more ports were already open, the UPnP support test 250 is successful, indicating that the IGD 125 supports UPnP (Universal Plug and Play).

In an embodiment, if the UPnP support test 250 fails the IGD 125 does not support UPnP and certain programs may not run properly on the user's computing device 140, or if such programs run, may execute in a degraded manner. However, a failed UPnP support test 250 does not generally indicate any failure in the computing device 140's basic Internet connectivity.

In an embodiment the UPnP support test 250 can take up to three (3) minutes to execute.

Certain scenarios, including, but not limited to, peer-to-peer (P2P) networking, etc., require an IGD 125 to establish and sustain many simultaneous connections for a length of time.

In an embodiment the multiple simultaneous connection test 260 establishes a predetermined number of concurrent connections in a predetermined number of batches through the IGD 125 and maintains the connections for a predetermined time. In an aspect of this embodiment the multiple simultaneous connection test 260 establishes a maximum of eighty (80) concurrent connections through the IGD 125 over a period of two (2) minutes by attempting continuous data download from the Internet 105 to the user's computing device 140 using HTTP (Hypertext Transfer Protocol).

In an embodiment, if the continuous data download of the multiple simultaneous connection test 260 is successful, the IGD 125 can handle a large number of simultaneous connections, indicating the user will likely be able to interact with the Internet 105 reliably using multiple applications and/or multiple computing devices 140, and that applications run on the user's computing device 140 that use multiple network streams, such as some file download/sharing programs, will function as intended.

In an embodiment, if the multiple simultaneous connection test 260 fails certain applications which use multiple network streams may run in a degraded manner and/or the user's computing device 140 may indicate issues when the user attempts to use many Internet applications simultaneously. However, a failed multiple simultaneous connection test 260 does not generally indicate any failure in the computing device 140's basic Internet connectivity.

In an embodiment the multiple simultaneous connection test 260 can take up to three (3) minutes to execute.

In an embodiment the connectivity tests 200 are run in the following order, one after the other: IPv4, or basic Internet, connectivity test 210, NAT type test 220, ECN support, or traffic congestion, test 230, windows scaling support, or TCP high performance, test 240, UPnP support test 250, and multiple simultaneous connection test 260. In alternative embodiments the connectivity tests 200 can be run in differing orders. In yet another alternative embodiment the connectivity tests 200 are run in random order.

In an embodiment, if the IPv4, or basic Internet, connectivity test 210 fails the execution of the suite of connectivity tests 200 is terminated. In an alternate embodiment, if any connectivity test 200 fails to execute properly the basic Internet connectivity test 210 is rerun. In this alternate embodiment, if the basic Internet connectivity test 210 successfully executes the next connectivity test 200 to be run is then initiated. In this alternate embodiment, if the basic Internet connectivity test 210 fails, the user will be requested to power cycle the IGD 125, as deemed appropriate, and the next connectivity test 200 to be run is then initiated. In yet another alternative embodiment, if any connectivity test 200 fails to execute properly the execution of the suite of connectivity tests 200 is terminated.

In an embodiment the ECN support, or traffic congestion, test 230 and the windows scaling support, or TCP High Performance, test 240 are not run when they are not suitable for the user's computing device operating system, e.g., but not limited to, Windows XP™. In this embodiment the ECN support, or traffic congestion, test 230 and the windows scaling support, or TCP High Performance, test 240 are run when the tests are suitable for the user's computing device operating system, e.g., but not limited to, an operating system that is a more currently developed operating system than Windows XP™, e.g., but not limited to, Windows Vista™.

In an embodiment the connectivity tests 200 of the ICE software component 170 are specifically designed to verify whether the IGD 125 in a home computing device network properly interacts with an operating system supported by a computing device 140 on the home computing device network. In an alternative embodiment connectivity tests of the ICE software component 170 are designed to verify whether the IGD 125 in a commercial, or corporate, environment network properly interacts with an operating system supported by a computing device 140 on the commercial environment network. In yet another alternative embodiment the connectivity tests of the ICE software component 170 are designed to verify whether the IGD 125 of a network, home or commercial, properly interacts with an operating system supported by a computing device 140 on the network.

In a embodiment the connectivity tests 200 of the ICE software component 170 can take up to ten (10) minutes to complete. In other embodiments the connectivity tests 200 of the ICE software component 170 can take other amounts of time to complete, e.g., one (1) minute, less than one (1) minute, two (2) minutes, five (5) minutes, etc.

In an embodiment one or more connectivity tests 200 of the ICE software component 170 can interrupt the computing device network's Internet connectivity. In an embodiment one or more connectivity tests 200 can cause the IGD 125 of the computing device network 150 to stop responding. In an embodiment the user is notified if it appears that the computing device network's Internet connectivity has been lost and/or the IGD 125 of the computing device network 150 has stopped responding. In an aspect of this embodiment if it appears that the computing device network's Internet connectivity has been lost and/or the IGD 125 of the computing device network 150 has stopped responding the user is directed to unplug the power cable from the IGD 125 and plug it back in, or otherwise cycle power to the IGD 125 of the computing device network 150, to attempt to restore Internet connectivity.

In an embodiment no connectivity test 200 makes any permanent changes to the setup of the IGD 125 of the computing device network 150.

In an embodiment, prior to deploying the ICE software component 170 to a user's computing device 140 and running the connectivity tests 200, the user is notified that if uninterrupted access to the Internet 105 is currently required, or desired, it is recommended that the ICE testing be performed at another time. Examples of when a user may require, or desire, uninterrupted Internet 105 access include, but are not limited to, currently downloading a large file, bidding on a time-sensitive Internet-based auction, or playing an online game.

Figure 3:
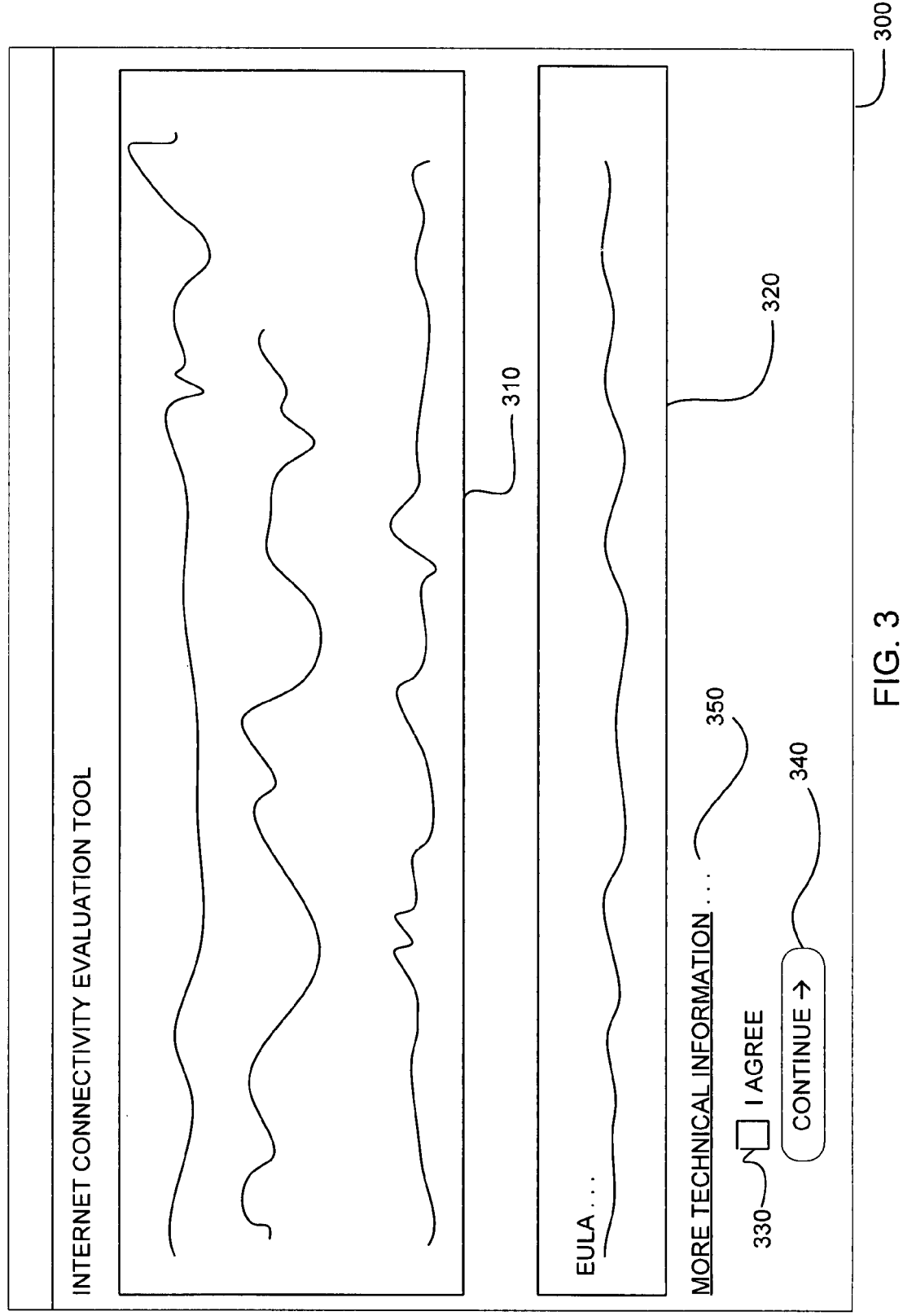
FIG. 3 depicts an exemplary embodiment screen exhibited on a user's computing device display that, inter alia, explains an embodiment Internet connectivity evaluation software component.

In an embodiment a screen generally explaining the ICE software component 170 connectivity tests 200 is displayed to the user via the user's computing device display. FIG. 3 depicts embodiment screen 300, which briefly describes the ICE software component 170 functionality. Text 310 on screen 300 provides a general explanation of the testing to be performed. In an embodiment, screen 300 includes end user licensing agreement text 320 which includes an assurance that no personal user information is gathered during testing. In an embodiment the user must check box 330 to agree to the conditions for testing and then click a continue box 340. In an embodiment additional information 350 about the suite of connectivity tests 200 to be run by the ICE software component 170 is provided to the user on exemplary screen 300 or subsequent screens provided to the user via the computing device display.

Figure 4:
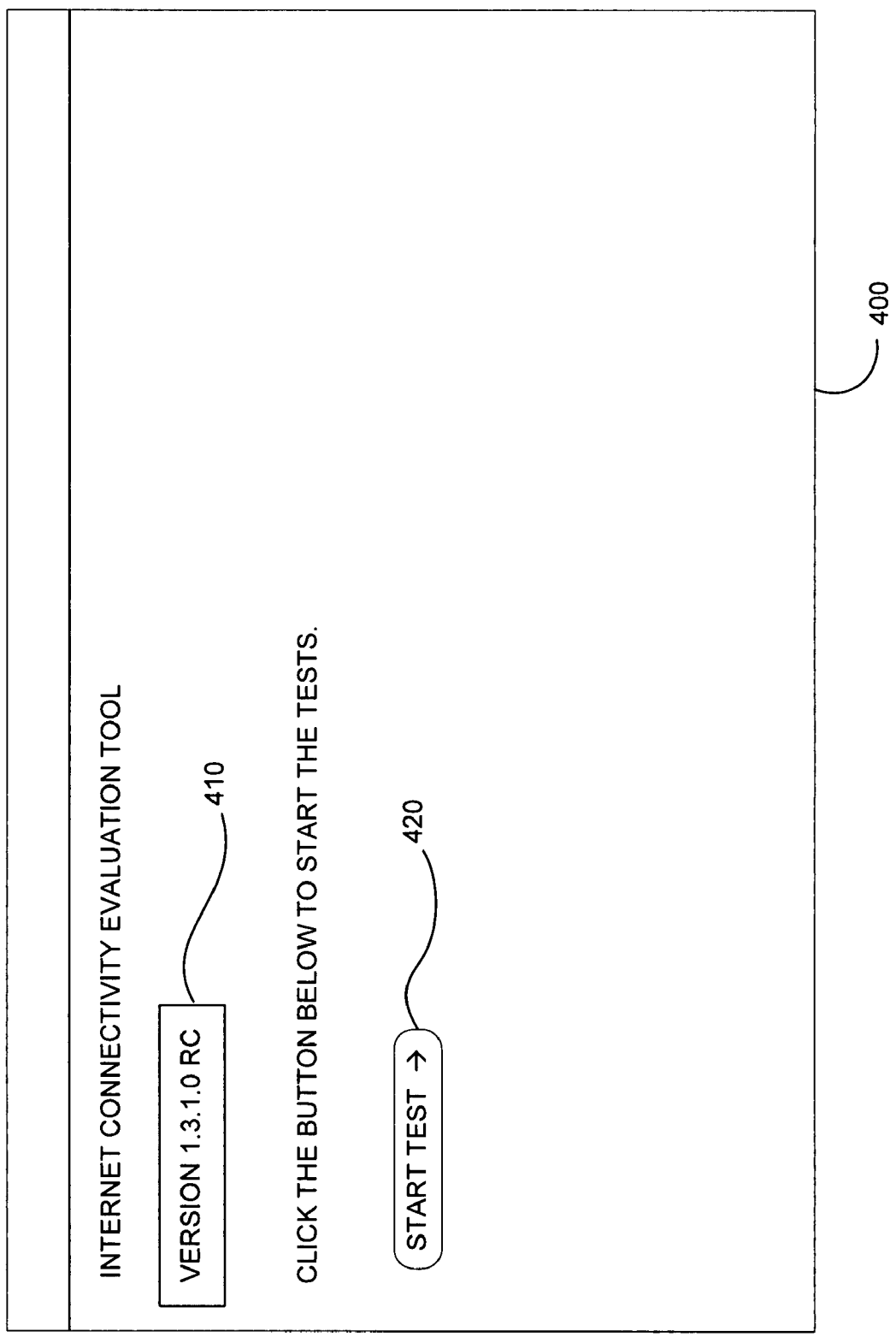
FIG. 4 depicts an exemplary embodiment screen exhibited on a user's computing device display that, inter alia, requires the user to select to start the execution of embodiment connectivity tests.

Referring to FIG. 4, in an embodiment a screen 400 requiring the user to actively initiate the ICE testing is displayed to the user's computing device display. Embodiment screen 400 has a start test button 420 which a user must click to deploy the current version ICE software component 170 to their computing device 140 and have it run. In an embodiment screen 400 indicates the version 410 of the ICE software component 170 that will be deployed to the user's computing device 140.

Figure 5:
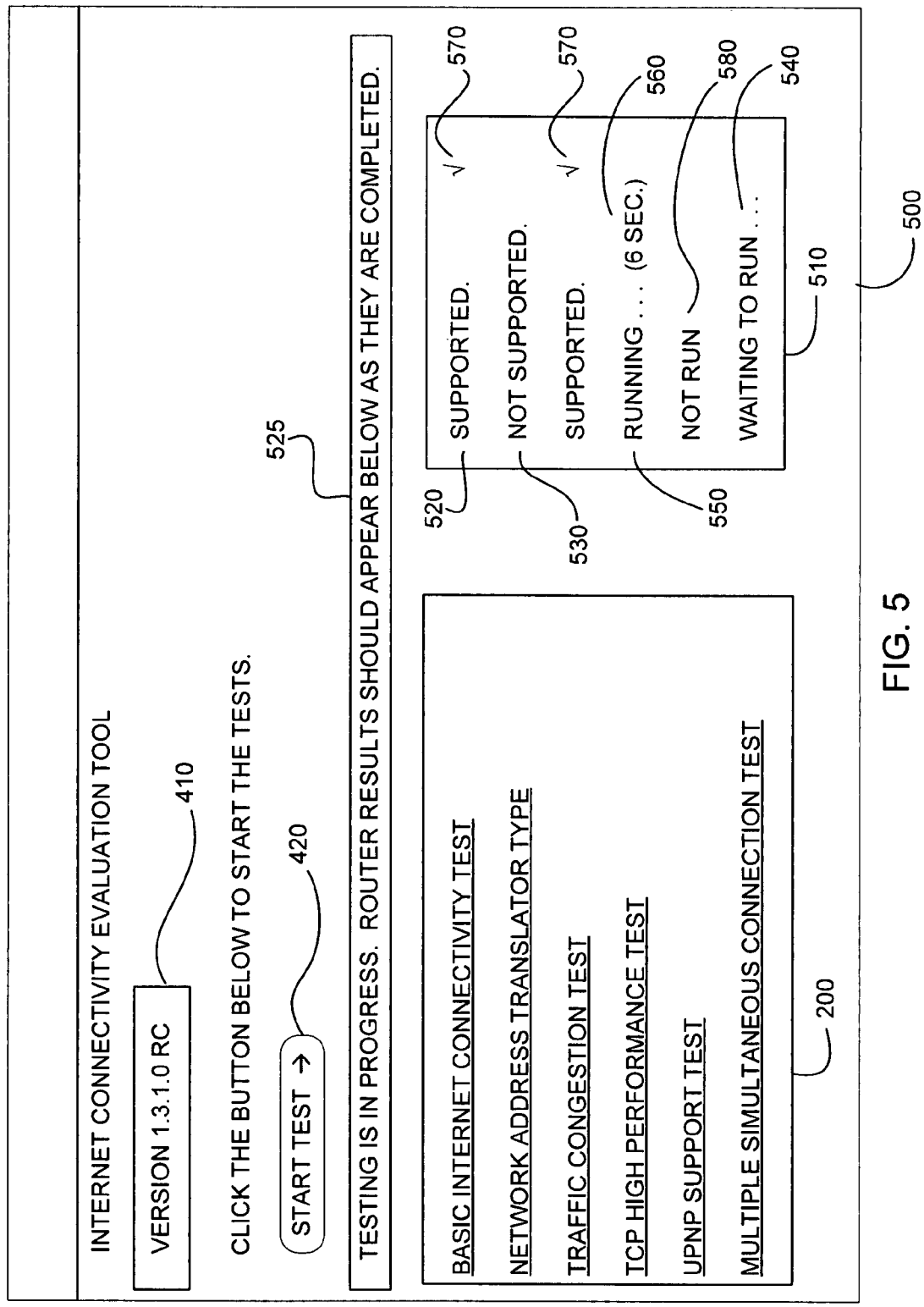
FIG. 5 depicts an exemplary embodiment screen exhibited on a user's computing device display while the embodiment connectivity tests are executing.

FIG. 5 shows an exemplary embodiment screen 500 that is displayed on a user's computing device display while ICE testing is in progress. In an embodiment screen 500 posts text 525 that indicates that the ICE testing is currently in progress.

In an embodiment all the connectivity tests 200 of the ICE software component 170 downloaded to a user's computing device 140 are identified on screen 500. In an embodiment the order of the connectivity tests 200 identified on exemplary screen 500 is the order, from first to last, that the connectivity tests 200 are run.

In an embodiment exemplary screen 500 displays status 510 for each connectivity test 200. In an embodiment one such status for a connectivity test 200 is that the functionality of the test 200 is either supported or not supported by the interaction between the IGD 125 and the current user's computing device operating system.

In an embodiment screen 500 indicates that a connectivity test 200 of the ICE software component 170 is "Supported" 520 once the connectivity test 200 has successfully executed. For example, in exemplary embodiment screen 500 the "Supported" status 520 for the IPv4, or basic Internet, connectivity test 210 indicates this connectivity test 210 successfully executed on the computing device network 150. In an aspect of this embodiment a check mark 570 accompanies the "Supported" status 520 displayed on screen 500.

In an embodiment screen 500 indicates that a connectivity test 200 of the ICE software component 170 is "Not supported" 530 if the connectivity test 200 fails to successfully execute. For example, in exemplary embodiment screen 500 the "Not supported" status 530 for the NAT type test 220 indicates this connectivity test 220 failed to properly execute on the computing device network 150.

In an embodiment screen 500 indicates that a connectivity test 200 of the ICE software component 170 is "Not run" 580 if the connectivity test 200 is not run for the current user's computing device operating system. For example, in an embodiment the ECN support, or traffic congestion, test 230 and the windows scaling support, or TCP High Performance, test 240 are not run when the user's computing device operating system is Windows XP™. Thus, in this example the corresponding status 510 displayed for each of the ECN support test 230 and the windows scaling support test 240 when the user's computing device operating system is Windows XP™ is "Not run" 580.

In an embodiment a "Waiting to run . . . " status 540 is displayed on screen 500 to identify a connectivity test 200 that is to be, but has not yet been, executed. For example, on exemplary embodiment screen 500 the "Waiting to run . . . " status 540 for the multiple simultaneous connection test 260 indicates this connectivity test 260 is waiting to be, but has not yet been, executed.

In an embodiment a "Running . . . " status 550 is displayed on screen 500 to identify the connectivity test 200 currently executing. For example, on exemplary embodiment screen 500 the "Running . . . " status 550 for the windows scaling support, or TCP high performance, test 240 identifies this connectivity test 240 as the current one executing.

In an embodiment the "Running . . . " status 550 is accompanied by an indication of the amount of time the connectivity test 200 has left to run, or otherwise execute, 560. For example, on exemplary embodiment screen 500 the "Running . . . " status 550 for the windows scaling support, or TCP high performance, test 240 is accompanied by an indication that the test currently has six (6) seconds left to run 560.

In an alternative embodiment the "Running . . . " status 550 is accompanied by an indication of the total amount of time for the particular connectivity test 200 to run, or otherwise execute. In yet another alternative embodiment the "Running . . . " status 550 is accompanied by an indication of the amount of time the connectivity test 200 has already been running, or executing.

Figure 6:
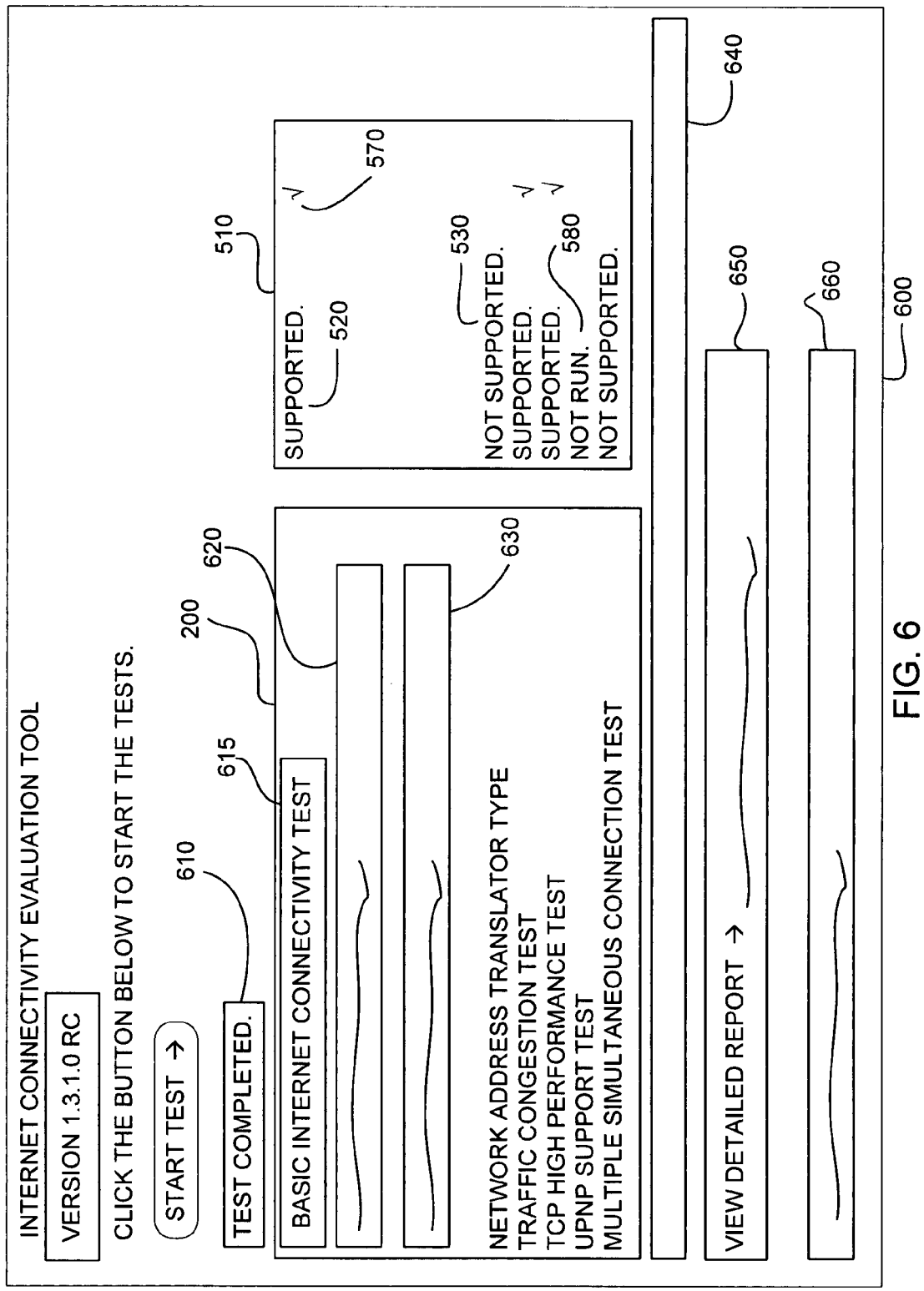
FIG. 6 depicts an exemplary embodiment screen exhibited on a user's computing device display after the Internet connectivity evaluation is completed.

FIG. 6 is an exemplary embodiment screen 600 that is displayed when the ICE testing is completed, or otherwise terminated. In an embodiment screen 600 posts text 610 indicating that the ICE testing has been completed.

In an embodiment all the connectivity tests 200 of the ICE software component 170 downloaded to a user's computing device 140 are identified on screen 600. In an embodiment the order of the connectivity tests 200 identified on screen 600 is the order, from first to last, that the connectivity tests 200 were, or were to be, run on the computing device network 150.

In an embodiment screen 600 displays status 510 for each connectivity test 200. In an embodiment the status for a connectivity test 200 that is displayed on screen 600 is that the test functionality is either supported or not supported by the interaction between the IGD 125 and the current user's computing device operating system or the test is not run because of the operating system currently hosted on the user's computing device 140.

In an embodiment screen 600 indicates that a connectivity test 200 of the ICE software component 170 is "Supported" 520 if the connectivity test 200 successfully executed. For example, in exemplary embodiment screen 600 the "Supported" status 520 for the IPv4, or basic Internet, connectivity test 210 indicates this connectivity test 210 successfully executed on the computing device network 150. In an aspect of this embodiment a check mark 570 accompanies the "Supported" status 520 displayed on screen 600.

In an embodiment screen 600 indicates that a connectivity test 200 of the ICE software component 170 is "Not supported" 530 if the connectivity test 200 failed to successfully execute. For example, in exemplary embodiment screen 600 the "Not supported" status 530 for the NAT type test 220 indicates this connectivity test 230 failed to successfully execute on the computing device network 150.

In an embodiment screen 600 indicates that a connectivity test 200 of the ICE software component 170 is "Not run" 580 when the test's functionality is not supported by the current user's computing device operating system. For example, in exemplary embodiment screen 600 the "Not run" status 580 for the UPnP support test 250 indicates this test 250 was not supported by the user's computing device operating system, and thus, was not executed.

In an embodiment a user can click on a connectivity test 200 indicated on screen 600 and a brief explanation 620 of the connectivity test 200 is displayed. For example, in an embodiment a user clicking on the basic Internet connectivity test indicator 615 will cause exemplary text 620 to be displayed, which indicates that the IPv4, or basic Internet, connectivity test 210 is a baseline test designed to check whether the user's computing device 140 has the most basic Internet connectivity.

In an embodiment screen 600 can post text 630 for each connectivity test 200 which indicates one or more consequences, if any, if the particular connectivity test 200 fails to execute. For example, in an embodiment text 630 posted for the IPv4, or basic Internet, connectivity test 210 indicates that if this test 210 fails to successfully execute the user's computing device 140 will not be able to browse Internet web sites.

In an embodiment screen 600 posts text 640 indicating the general outcome of the ICE software component 170 testing. In an embodiment the text 640 can indicate all the connectivity tests 200 successfully executed. In an embodiment the text 640 can indicate none of the connectivity tests 200 successfully executed. In an embodiment the text 640 can indicate a subset of the connectivity tests 200 successfully executed;

i.e., one or more connectivity tests 200 successfully executed while one or more other connectivity tests 200 either were not run or did not successfully execute.

In an embodiment screen 600 has a detailed report option 650 that a user can click on, or otherwise select, to get a detailed report of the execution of the connectivity tests 200 of the ICE software component 170.

In an embodiment screen 600 has an IGD option 660 that a user can click on, or otherwise select, to get a listing of currently known IGDs 125 that have been proven to successfully interact with one or more particular operating systems. In an aspect of this embodiment exemplary screen 600 has an IGD option 660 that a user can click on, or otherwise select, to get a listing of currently known IGDs 125 that have been certified to work properly with the Vista™ operating system.

Figure 7:
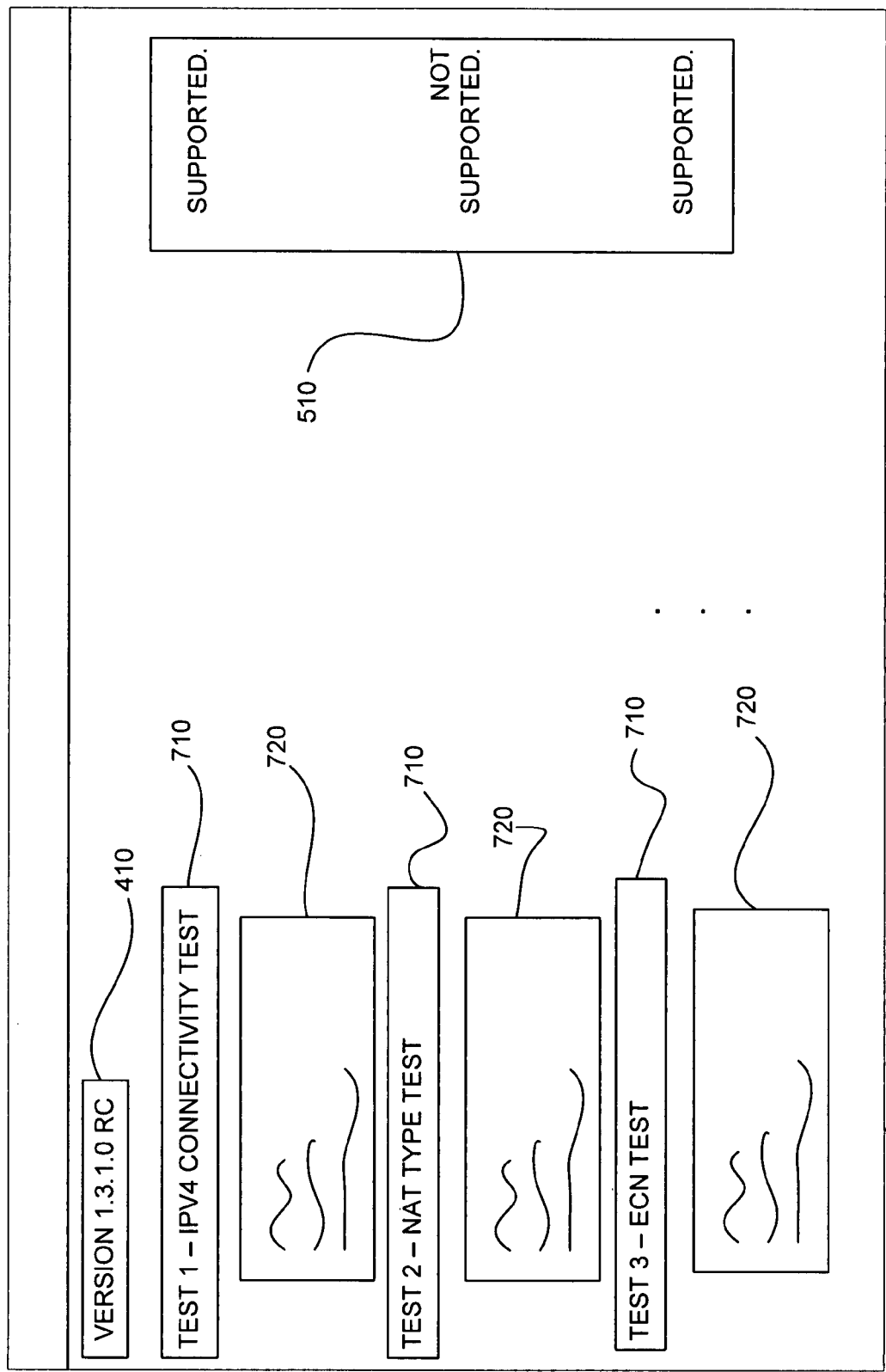
FIG. 7 depicts an exemplary embodiment screen exhibited on a user's computing device display that, inter alia, provides a detailed report of the execution of each of the embodiment connectivity tests.

FIG. 7 is an exemplary embodiment detailed report screen 700 that displays a detailed report for one or more of the connectivity tests 200 once the ICE testing is completed, or otherwise terminated. In an embodiment screen 700 is displayed on the user's computing device display when the user clicks on, or otherwise selects, the detailed report option 650 of exemplary embodiment screen 600.

In an embodiment the detailed report screen 700 has an identifier 710 for each of the connectivity tests 200 of the ICE software component 170. In an embodiment a detailed report 720 of the execution of the particular connectivity test 200 is displayed under each respective connectivity test identifier 710 on detailed report screen 700. In an embodiment the detailed report screen 700 indicates the test status, i.e., "Supported" 520, "Not Supported" 530 or "Not run" 580, for each of the connectivity tests 200.

FIG. 8A is an exemplary embodiment detailed report 800 for a successfully executed IPv4, or basic Internet, connectivity test 210. FIG. 8B is an exemplary embodiment detailed report 810 for a NAT type connectivity test 220 that failed to successfully execute.

Figure 9A:
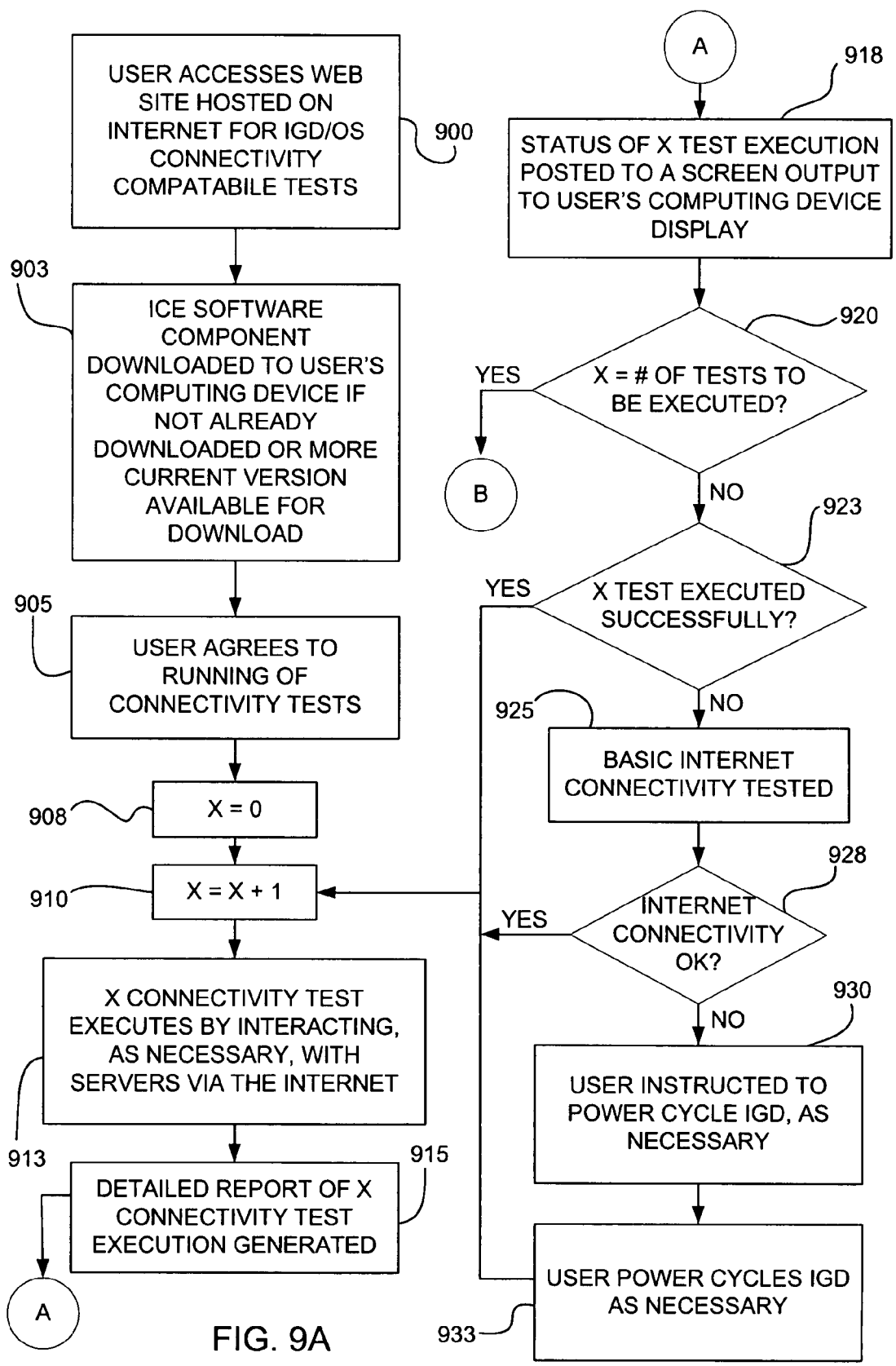
FIGS. 9A and 9B illustrate an embodiment logic flow for Internet connectivity evaluation.
Figure 9B:
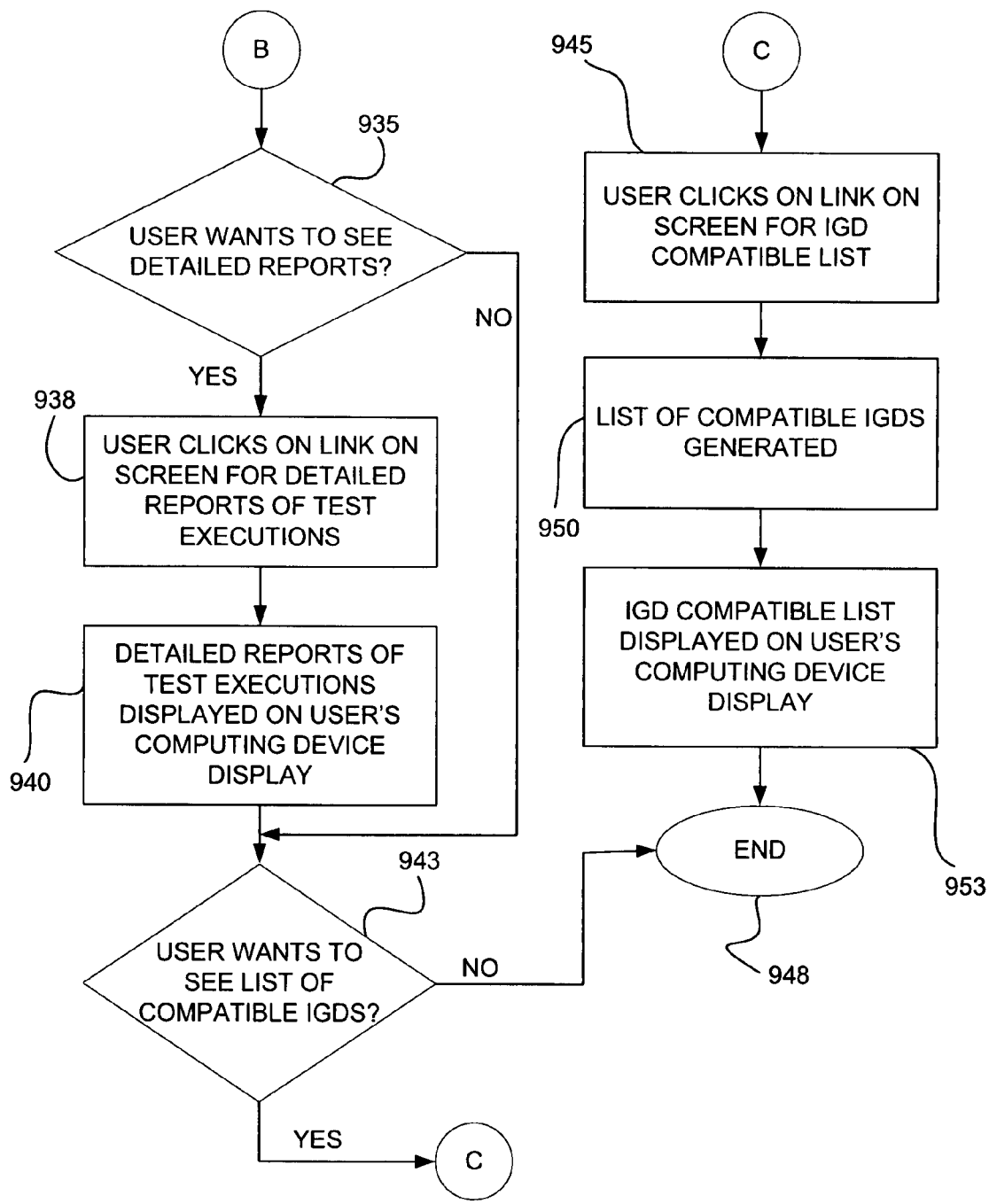

FIGS. 9A and 9B illustrate an embodiment logic flow for a methodology for Internet connectivity evaluation between the operating system operating on a user's computing device and an IGD. While the following discussion is made with respect to systems portrayed herein, the operations described may be implemented in other systems. Further, the operations described herein are not limited to the order shown. Additionally, in other alternative embodiments more or fewer operations may be performed.

Referring to FIG. 9A, a user of a computing device uses the computing device to access a web site hosted on the Internet for performing Internet connectivity evaluation between the operating system operating on the user's computing device and the IGD interacting with the user's computing device 900. An embodiment Internet connectivity evaluation (ICE) software component is downloaded to the user's computing device if the computing device does not currently host the ICE software component or there is a more current version ICE software component on the web site than the ICE software component currently residing on the user's computing device 903. In an aspect of this embodiment the user does not install the ICE software component; rather the ICE software component is automatically downloaded to the user's computing device and installed as appropriate 903, upon user agreement to perform connectivity testing. In this manner, even a novice user can easily, and quickly, gain access to and have connectivity testing performed with the user's computing network 150.

In an embodiment the user agrees to, or otherwise activates, the running of the connectivity tests of the ICE software component by clicking, or otherwise selecting, a start button exhibited on a screen on the user's computing device display 905.

In an embodiment a variable is initiated to keep track of the number of connectivity tests to be run, or executed, 908. In an embodiment the current connectivity test to be executed is identified 910 and then the identified connectivity test to be run is executed 913. In an embodiment, during the execution of a connectivity test the ICE software component now hosted on the user's computing device interacts with the IGD of the computing network 913. In an embodiment, during the execution of a connectivity test the ICE software component now hosted on the user's computing device interacts with the Internet and one or more servers, or server-type devices, 913.

In an embodiment all analysis necessary for the identified connectivity test currently executing is performed locally on the user's computing device 913, providing additional security to the user and the user's computing device.

In an embodiment a detailed report of the execution of the identified connectivity test is generated 915.

In an embodiment status of the execution of the identified connectivity test is posted to a screen that is exhibited on the user's computing device display 918. In an aspect of this embodiment, if a connectivity test is not executed for any reason, including, but not limited to, the test is not compatible with the operating system currently executing on the user's computing device, the status of the non-execution of the connectivity test is posted to the screen exhibited on the user's computing device display 918. In a second aspect of this embodiment, status indicating a connectivity test has not yet been executed, but is waiting to be run, is posted to the screen exhibited on the user's computing device display 918. In a At decision block 920 a determination is made as to whether all the connectivity tests of the ICE software component have been executed or otherwise have been identified as tests that cannot be executed with the operating system currently hosted on the user's computing device. If no, i.e., one or more connectivity tests are still to be run, then at decision block 923 a determination is made as to whether the currently identified connectivity test that was just run executed successfully.

If yes, the next connectivity test to be run is identified 910. If, however, at decision block 923 it is determined that the currently identified connectivity test that was just run did not execute successfully, then in an embodiment the IPv4, or basic Internet, connectivity test is rerun 925. At decision block 928 a determination is then made as to whether the user's computing device has basic Internet connectivity. If yes, the next connectivity test to be run is identified 910.

If at decision block 928 it is determined that the user's computing device does not have basic Internet connectivity, then in a embodiment the user is instructed by the Internet connectivity evaluation software component to power cycle the IGD as necessary 930. The user then, as instructed, power cycles the IGD as necessary 933. In an embodiment the next connectivity test to be run is then identified 910.

If, at decision block 920 it is determined that all the connectivity tests of the ICE software component have run or otherwise have been identified as tests that cannot be executed with the operating system currently hosted on the user's computing device then, referring to FIG. 9B, decision block 935 queries whether or not the user wants to see detailed reports of the connectivity test executions.

If yes, in an embodiment the user clicks on, or otherwise selects, a link exhibited on an embodiment screen output to the user's computing device display to request the detailed reports for the connectivity tests executions 938. In an embodiment a detailed report for each connectivity test executed is then displayed on an embodiment screen exhibited on the user's computing device display 940.

In an embodiment a determination is made at decision block 943 as to whether the user wants to see an identification of compatible IGDs. If yes, in an embodiment the user clicks on, or otherwise selects, a link exhibited on an embodiment screen output to the user's computing device display to request the compatible IGD list 945. A list, or other known data collection mechanism, of IGDs that support a predetermined level of Internet connectivity with one or more identified operating systems, i.e., compatible IGDs, is generated 950 and then displayed on an embodiment screen exhibited on the user's computing device display 953.

In an embodiment the Internet connectivity evaluation is then ended, or finalized 948.

Computing Device System Configuration

Figure 10:
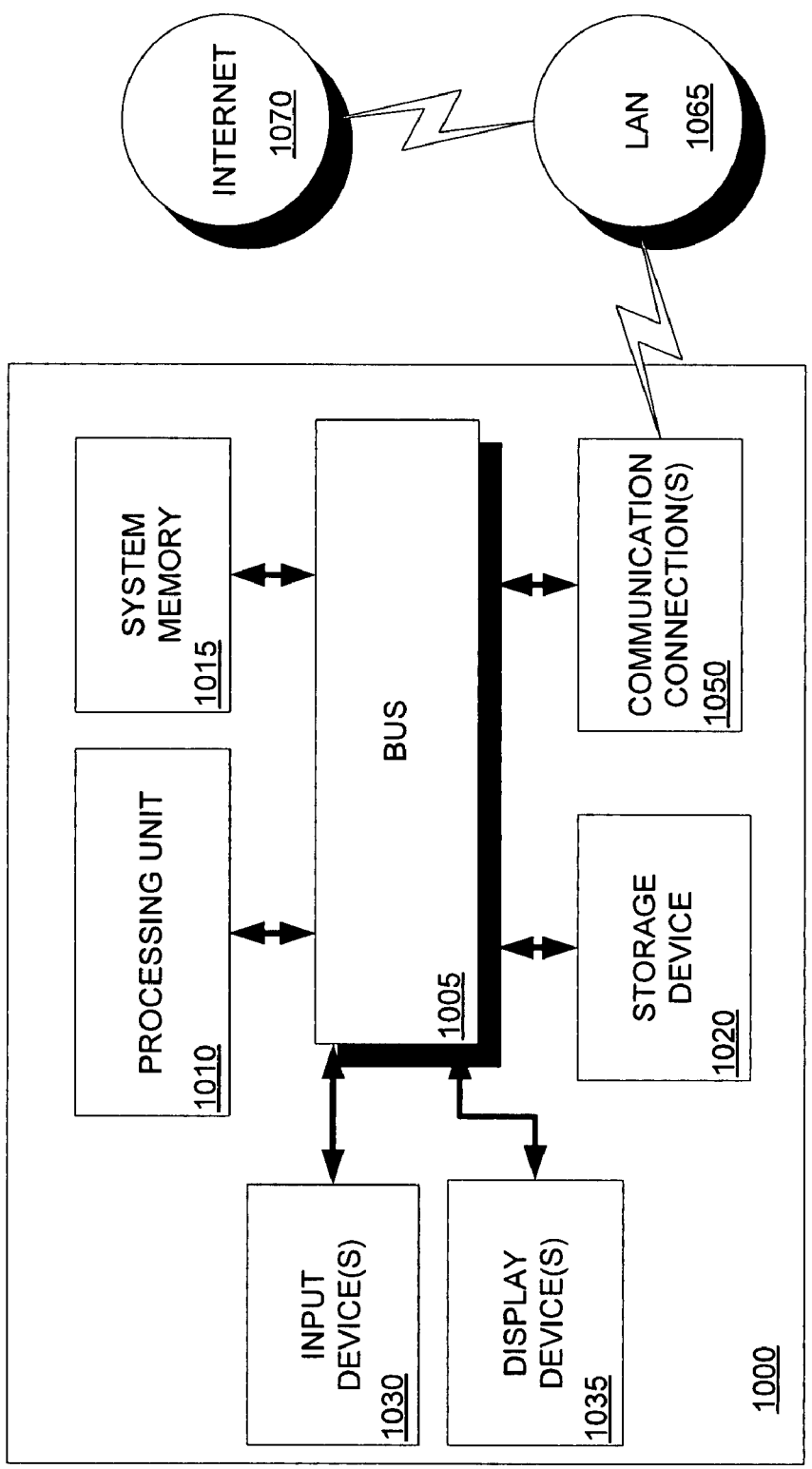
FIG. 10 is a block diagram of an exemplary basic computing device system that can process software, i.e., program code, or instructions.

FIG. 10 is a block diagram that illustrates an exemplary computing device system 1000 upon which an embodiment can be implemented. The computing device system 1000 includes a bus 1005 or other mechanism for communicating information, and a processing unit 1010 coupled with the bus 1005 for processing information. The computing device system 1000 also includes system memory 1015, which may be volatile or dynamic, such as random access memory (RAM), non-volatile or static, such as read-only memory (ROM) or flash memory, or some combination of the two. The system memory 1015 is coupled to the bus 1005 for storing information and instructions to be executed by the processing unit 1010, and may also be used for storing temporary variables or other intermediate information during the execution of instructions by the processing unit 1010. The system memory 1015 often contains an operating system and one or more programs, and may also include program data.

In an embodiment, a storage device 1020, such as a magnetic or optical disk, is also coupled to the bus 1005 for storing information, including program code comprising instructions and/or data.

The computing device system 1000 generally includes one or more display devices 1035, such as, but not limited to, a display screen, e.g., a cathode ray tube (CRT) or liquid crystal display (LCD), a printer, and one or more speakers, for providing information to a computing device user. The computing device system 1000 also generally includes one or more input devices 1030, such as, but not limited to, a keyboard, mouse, trackball, pen, voice input device(s), and touch input devices, which a computing device user can use to communicate information and command selections to the processing unit 1010. All of these devices are known in the art and need not be discussed at length here.

The processing unit 1010 executes one or more sequences of one or more program instructions contained in the system memory 1015. These instructions may be read into the system memory 1015 from another computing device-readable medium, including, but not limited to, the storage device 1020. In alternative embodiments, hard-wired circuitry may be used in place of or in combination with software program instructions. Thus, the computing device system environment is not limited to any specific combination of hardware circuitry and/or software.

The term "computing device-readable medium" as used herein refers to any medium that can participate in providing program instructions to the processing unit 1010 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 1015 and storage device 1020 of the computing device system 1000 are further examples of storage media. Examples of transmission media include, but are not limited to, wired media such as coaxial cable(s), copper wire and optical fiber, and wireless media such as optic signals, acoustic signals, RF signals and infrared signals.

The computing device system 1000 also includes one or more communication connections 1050 coupled to the bus 1005. The communication connection(s) 1050 provide a two-way data communication coupling from the computing device system 1000 to other computing devices on a local area network (LAN) 1065 and/or wide area network (WAN), including the World Wide Web, or Internet 1070. Examples of the communication connection(s) 1050 include, but are not limited to, an integrated services digital network (ISDN) card, modem, LAN card, and any device capable of sending and receiving electrical, electromagnetic, optical, acoustic, RF or infrared signals.

Communications received by the computing device system 1000 can include program instructions and program data. The program instructions received by the computing device system 1000 may be executed by the processing unit 1010 as they are received, and/or stored in the storage device 1020 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for Internet connectivity evaluation with a computing device comprising an operating system and a computing device display, the method comprising:

receiving, at the computing device, a software program from a web site, wherein the software program comprises one or more connectivity tests;

running the software program by the operating system of the computing device to execute the one or more connectivity tests, wherein execution of at least one of the one or more connectivity tests comprises receiving data over a network for verifying whether an Internet gateway device (IGD) properly interacts with the operating system of the computing device;

analyzing results of execution of each of the one or more connectivity tests that are executed;

exhibiting, on the computing device display, a result status for each of the one or more connectivity tests that are executed to indicate the results of execution of each of the one or more connectivity tests that are executed; and exhibiting, on the computing device display, an identification of one or more IGDs that have been identified as compatible with the operating system of the computing device.

2. The method for Internet connectivity evaluation with a computing device of claim 1 wherein the computing device is located in a residence.

3. The method for Internet connectivity evaluation with a computing device of claim 2, wherein execution of each of the one or more connectivity tests requires communicating with the IGD, and wherein the IGD is located in the residence.

4. The method for Internet connectivity evaluation with a computing device of claim 1, further comprising:
generating a detailed status for each of the one or more connectivity tests that are executed, wherein each of the one or more connectivity tests comprises one or more steps that are executed and wherein the detailed status generated for each of the one or more connectivity tests comprises a report identifying a result of execution of at least one step of the one or more steps executed for each connectivity test; and
exhibiting, on the computing device display, a detailed status generated for at least one of the one or more connectivity tests that are executed.

5. The method for Internet connectivity evaluation with a computing device of claim 1, further comprising the software program automatically installing on the computing device.

6. The method for Internet connectivity evaluation with a computing device of claim 1, wherein the software program comprises a basic Internet connectivity test, a network address translation type test, a traffic congestion test, a TCP high performance test, a UPnP support test and a multiple simultaneous connection test.

7. The method for Internet connectivity evaluation with a computing device of claim 1, wherein the operating system does not execute one or more connectivity tests that have been identified as being not compatible with the operating system of the computing device.

8. The method for Internet connectivity evaluation with a computing device of claim 1, wherein execution of at least one of the one or more connectivity tests comprises receiving data from a server via the Internet.

9. The method for Internet connectivity evaluation with a computing device of claim 1, wherein the software program is run when a user of the computing device selects a command exhibited on a screen output to the computing device display.

10. The method for Internet connectivity evaluation with a computing device of claim 1, further comprising:
exhibiting, on the computing device display, a running status for a connectivity test of the one or more connectivity tests that is currently executing; and
exhibiting, on the computing device display, a waiting status for each connectivity test of the one or more connectivity tests that has not yet executed.

11. A method for Internet connectivity testing, the method comprising:
hosting, on a website on the Internet, an Internet connectivity evaluation program comprising a version identification, one or more connectivity tests, and an identification of one or more Internet gateway devices (IGDs) that have been identified as compatible with an operating system that can execute on a computing device; and
downloading the Internet connectivity evaluation program from the website to the computing device if the computing device does not currently host the Internet connectivity evaluation program or if the version identification of the Internet connectivity evaluation program indicates that the Internet connectivity evaluation programs hosted on the website is a more current version of the Internet connectivity evaluation program that is hosted on the computing device.

12. The method for Internet connectivity testing of claim 11, wherein a first connectivity test of the one or more connectivity tests is a basic Internet connectivity test, a second connectivity test of the one or more connectivity tests is a network address translation type test, a third connectivity test of the one or more connectivity tests is a traffic congestion test, a fourth connectivity test of the one or more connectivity tests is a TCP high performance test, a fifth connectivity test of the one or more connectivity tests is a UPnP support test, and a sixth connectivity test of the one or more connectivity tests is a multiple simultaneous connection test.

13. The method for Internet connectivity testing of claim 11 wherein the downloading of the Internet connectivity evaluation program from the website to a computing device is performed automatically upon a user accessing the website providing agreement to the website for the downloading.

14. A computing device-readable storage medium storing program instructions causing a computing device to perform the method for Internet connectivity testing of claim 11.

15. A computing device-readable storage medium storing program instructions that, when executed by a computing device comprising an operating system and a computing display device, cause the computing device to perform a method for Internet connectivity evaluation, the method comprising:
receiving, at the computing device, a software program from a web site, wherein the software program comprises one or more connectivity tests;
running the software program by the operating system of the computing device to execute the one or more connectivity tests, wherein execution of at least one of the one or more connectivity tests comprises receiving data over a network for verifying whether an Internet gateway device (IGD) properly interacts with the operating system of the computing device;
analyzing results of execution of each of the one or more connectivity tests that are executed;
exhibiting, on the computing device display, a status for each of the one or more connectivity tests to indicate a current condition of each of the one or more connectivity tests; and
exhibiting, on the computing display device, an identification of one or more IGDs that have been identified as compatible with the operating system of the computing device.

16. The computing device-readable storage medium of claim 15, wherein the status for a particular connectivity test comprises one of:
a first status that indicates the particular connectivity test executed successfully,
a second status that indicates the particular connectivity test failed to execute successfully,
a third status that indicates the particular connectivity test is waiting to execute, and
a fourth status that indicates the particular connectivity test is currently executing.

17. The computing device-readable storage medium of claim 15, further storing program instructions for:
generating a detailed status for each of the one or more connectivity tests that are executed, wherein each of the one or more connectivity tests comprises one or more steps that are executed and wherein the detailed status generated for each of the one or more connectivity tests comprises a report identifying a result of execution of at least one step of the one or more steps executed for each connectivity test; and exhibiting, on the computing device display, a detailed status generated for at least one of the one or more connectivity tests that are executed.

18. The computing device-readable storage medium of claim 15, wherein the software program comprises a basic Internet connectivity test, a network address translation type test, a traffic congestion test, a TCP high performance test, a UPnP support test and a multiple simultaneous connection test.

19. The computing device-readable storage medium of claim 15, wherein execution of at least one of the one or more connectivity tests comprises receiving at least one text file.

20. The computing device-readable storage medium of claim 15, wherein the operating system does not execute one or more connectivity tests that have been identified as being not compatible with the operating system of the computing device.

* * * * *